United States Patent
Ham

(10) Patent No.: US 8,135,277 B2
(45) Date of Patent: *Mar. 13, 2012

(54) DELAYED OPTICAL ROUTER/SWITCH

(75) Inventor: Byoung-Seung Ham, Incheon (KR)

(73) Assignee: INHA-Industry Partnership Institute, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/280,933

(22) PCT Filed: Dec. 26, 2007

(86) PCT No.: PCT/KR2007/006847
§ 371 (c)(1),
(2), (4) Date: Aug. 27, 2008

(87) PCT Pub. No.: WO2009/072694
PCT Pub. Date: Jun. 11, 2009

(65) Prior Publication Data
US 2010/0232792 A1    Sep. 16, 2010

(30) Foreign Application Priority Data
Dec. 6, 2007    (KR) .................. 10-2007-0126380

(51) Int. Cl.
*H04J 14/00* (2006.01)
*H04B 10/20* (2006.01)
(52) U.S. Cl. ............... 398/45; 398/55; 359/298; 385/4
(58) Field of Classification Search .......... 398/45–56, 398/91, 92, 96, 186, 200, 201; 359/240, 359/257, 298; 385/4, 5, 9, 16
See application file for complete search history.

(56) References Cited

U.S. PATENT DOCUMENTS

| | | | | |
|---|---|---|---|---|
| 2002/0015205 A1* | 2/2002 | Ham | ................ | 359/139 |
| 2002/0021474 A1* | 2/2002 | Ham | ................ | 359/181 |
| 2003/0076865 A1 | 4/2003 | Chang-Hasnain | | |
| 2010/0002276 A1* | 1/2010 | Ham | ................ | 359/108 |
| 2010/0232001 A1* | 9/2010 | Ham | ................ | 359/108 |

* cited by examiner

OTHER PUBLICATIONS

Notice of Allowance dated Jan. 13, 2010, Korean Patent Application No. KR-10-2007-0126380.

*Primary Examiner* — Kenneth N Vanderpuye
*Assistant Examiner* — Daniel Dobson
(74) *Attorney, Agent, or Firm* — Vierra Magen Marcus & DeNiro LLP

(57) ABSTRACT

A system, method, and apparatus for delayed optical router based on slow light and nondegenerate four-wave mixing processes are presented, in which three laser pulses interact with a three-level nonlinear optical medium composing two closely spaced ground states and an excited state. The delayed optical routing mechanism is based on a slow light phenomenon, in which a group velocity of an incoming input signal pulse is slowed down due to quantum coherence induced refractive index change. The two-photon coherence induced on the ground states via electromagnetically induced transparency is optically recovered via nondegenerate four-wave mixing processes. The nondegenerate four-wave mixing generation is enhanced owing to absorption cancellation. In this case, the individual pulse switching/routing time is limited by the coherence decay time that is much faster than population decay time, where the population decay-time is a limiting factor of conventional switching devices. In the present invention of the delayed optical router the overall switching/routing time, however, is controlled to be delayed by using the slow light. Even though the overall switching/routing time can be delayed, the switching bandwidth of the present invention is not degraded at all because the input and output signal's group velocity across the delayed optical router is still same. Therefore, the present invention of the delayed optical router gives an advantage of wide-bandwidth optical data traffic control using a narrow-bandwidth processing unit such as an electronic device. Another advantage is signal amplifications owing to the dark-resonance enhanced nondegenerate four-wave mixing processes.

20 Claims, 5 Drawing Sheets

[Fig. 1]
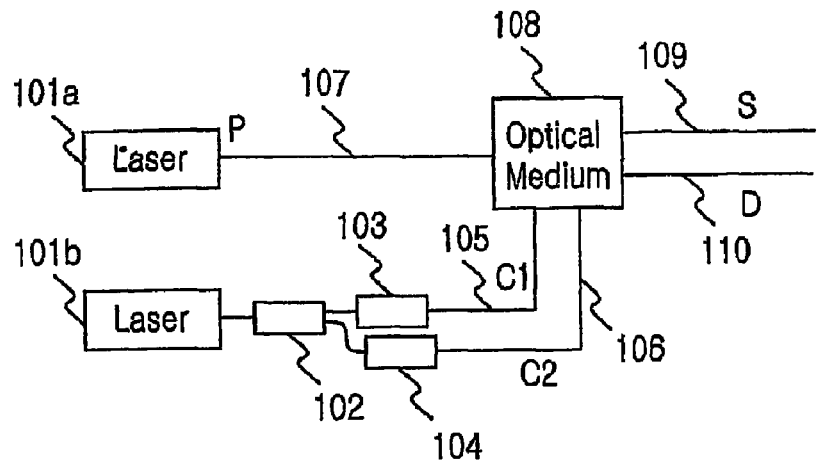
[Fig. 2]
(a) 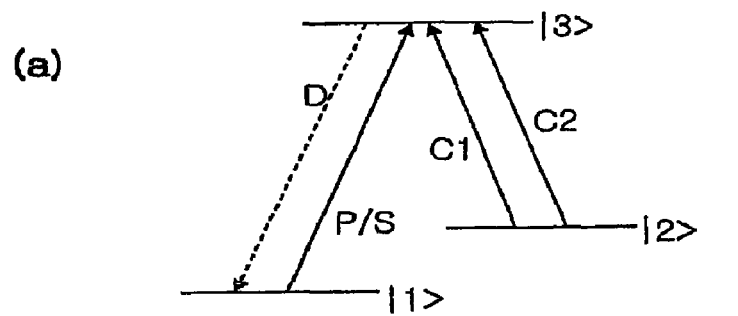
(b) 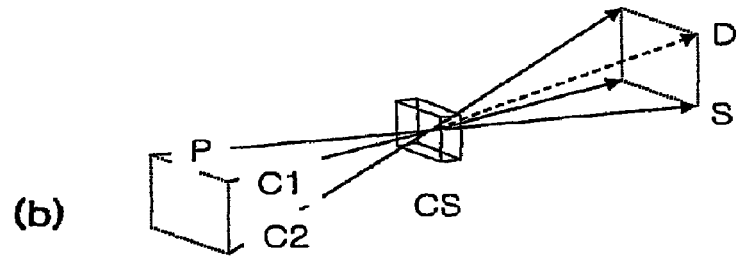
(c) 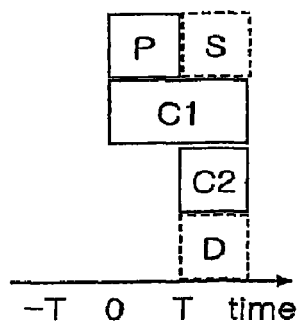

[Fig. 3]
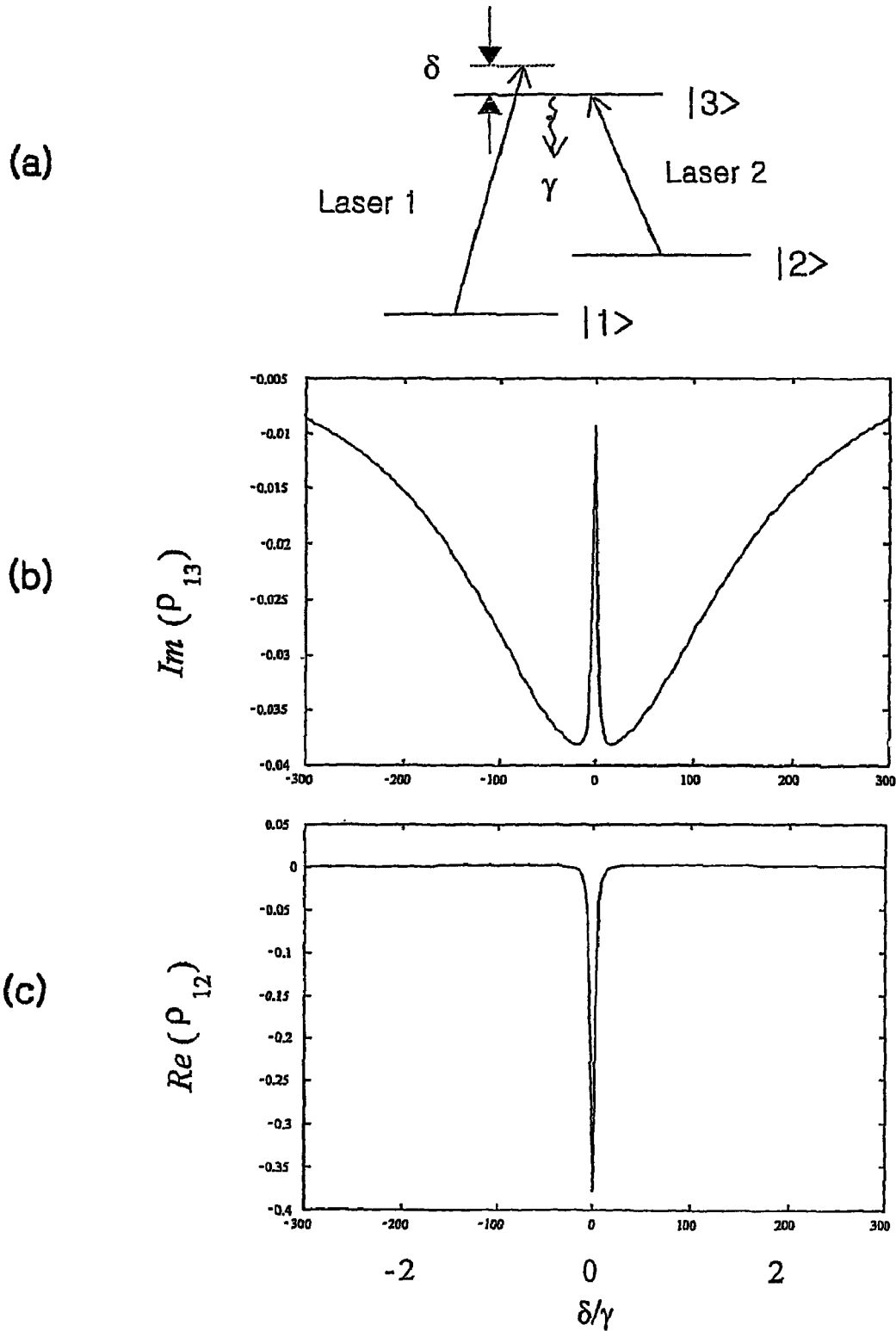

[Fig. 4]
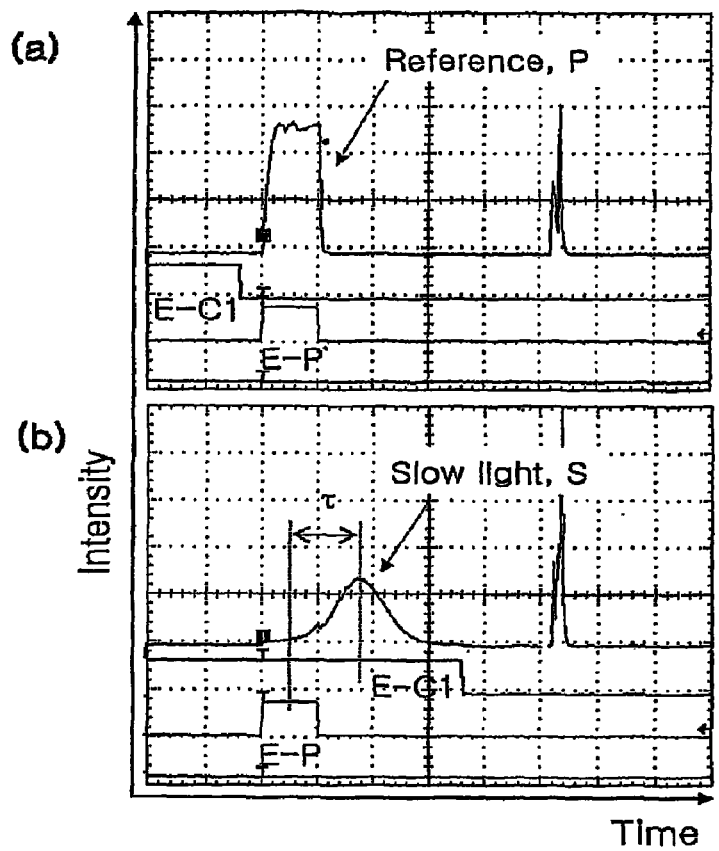
[Fig. 5]
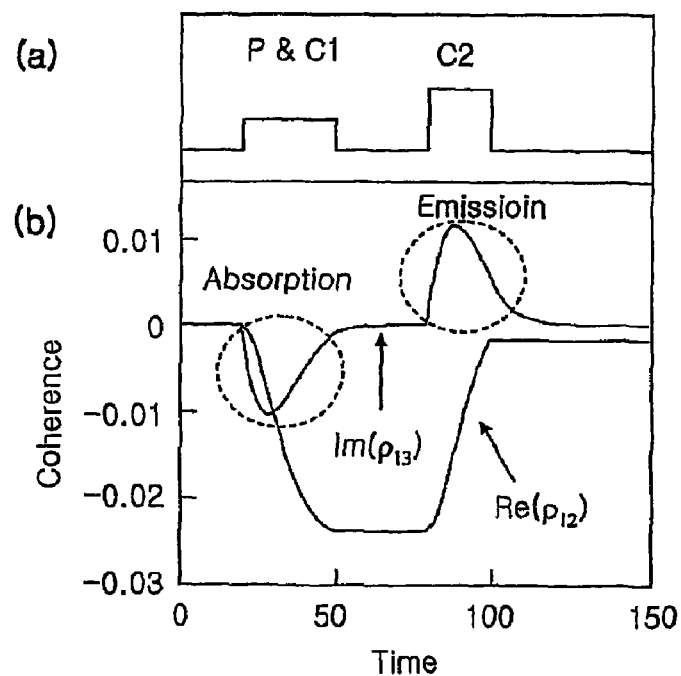

[Fig. 6]
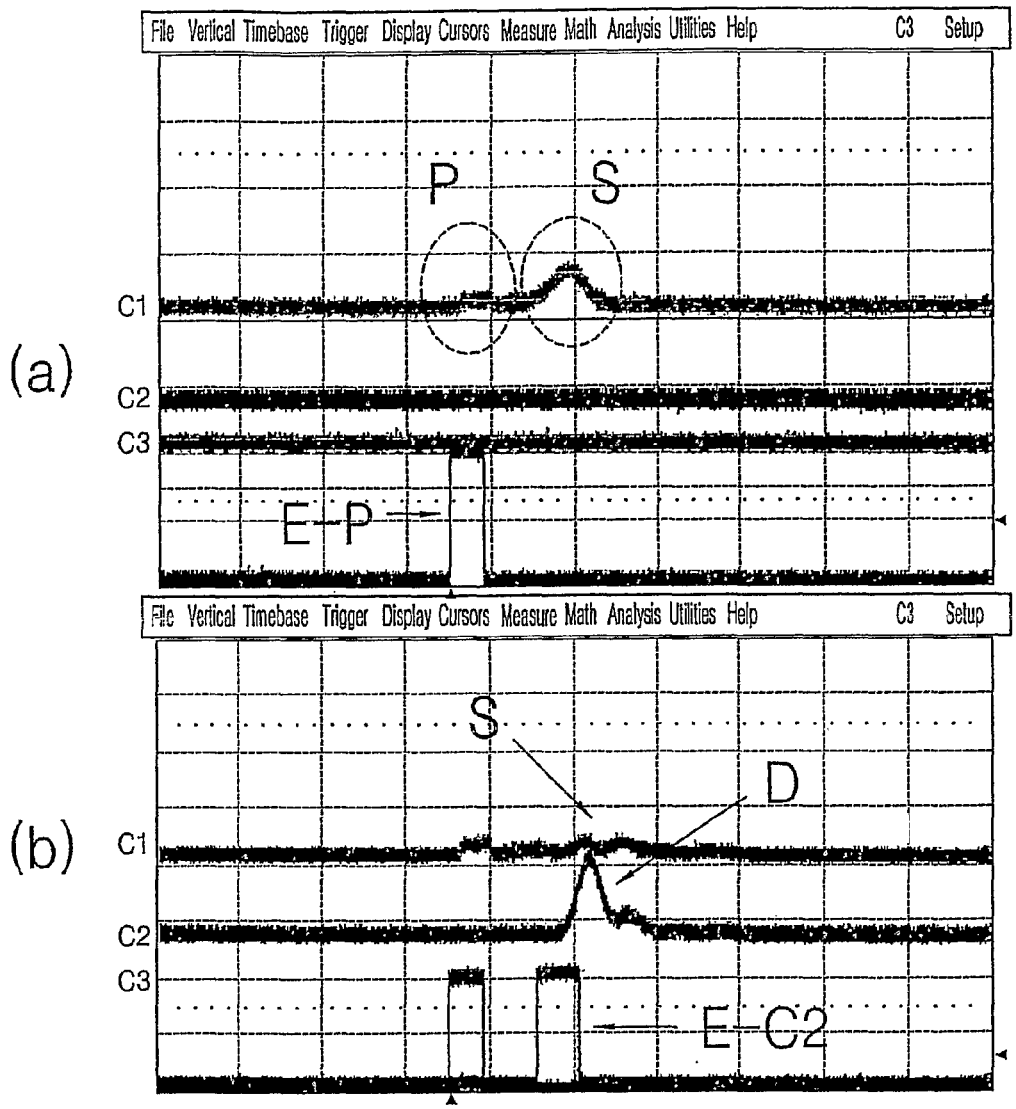

[Fig. 7]
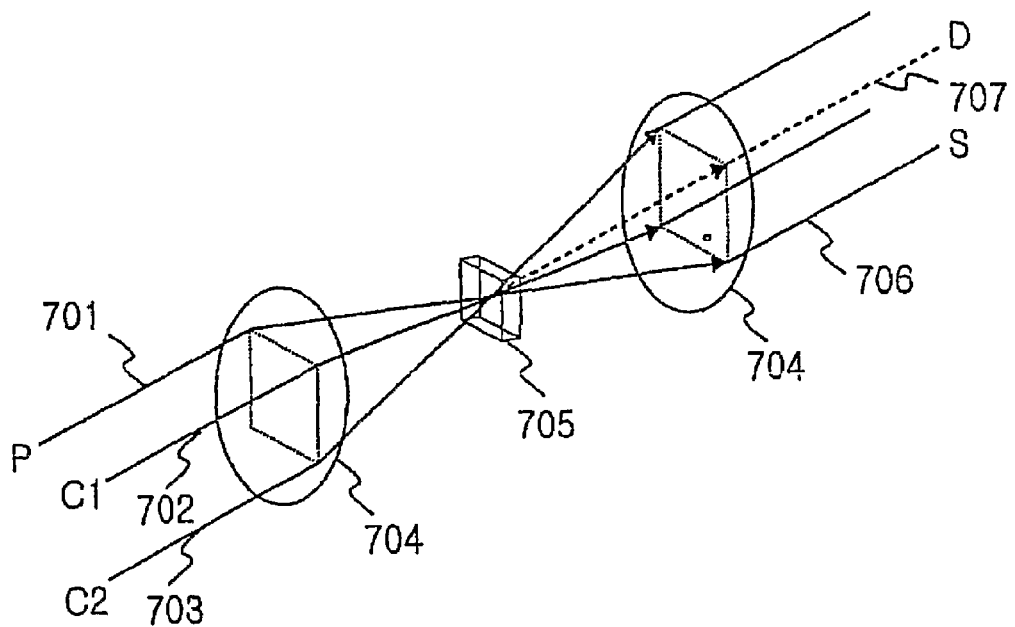
[Fig. 8]
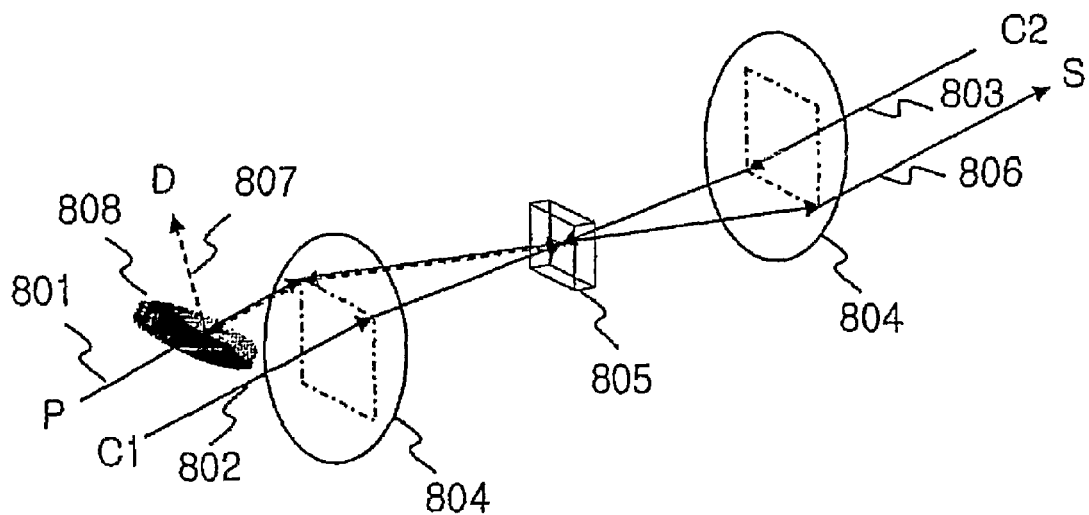

DELAYED OPTICAL ROUTER/SWITCH

BACKGROUND OF THE INVENTION

1. Field of the Invention

The present invention relates to a method and apparatus for an optical switch and routing based on quantum coherence, specifically using slow light phenomenon and nondegenerate four-wave mixing processes.

2. Description of the Related Art

An optical router is a switching device applied to convert an optical signal into another one at different propagation direction with either the same frequency basis or not. The optical router is a subcategory of an optical switch that is in general used to drop, add, multiplex, or convert an optical signal into another one. In fiber-optic communications, as more data traffic increases, more information bandwidth is needed. In this case a wider bandwidth optical switch is obviously demanded. However preparation of wide bandwidth optical switch is not simply easy because of technical limitations in switching devices such as an inherently limited optical switching time and slow electronics. Thus, more often it is required that the data traffic in fiber-optic communication lines need to be temporally holt for some data processing purposes. Obviously, an optical buffer memory becomes an essential component to an optical data processing unit. In the optical switching area, several switching methods have been introduced. Of them are semiconductor-optical-amplifier (SOA)-based optical switch, LiNbO3 optical switch, and semiconductor intersubband-utilized optical switch. The SOA-based optical switch and LiNbO3 optical switch are utilizing refractive index change induced by electric current or voltage. In the conventional optical switching technologies, the time needed for the refractive index change has been a constraint of the optical switching devices. Thus 10~100 GHz optical switching has been an upper limit. Based on these optical switching technologies, faster switching relates to shorter pulse length. Therefore, the relation between the switching time and the bandwidth is inversely proportional to each other.

On the other hand, it is well known that resonant two-color electromagnetic fields can induce refractive index change in a nonlinear optical medium composed of three energy levels or more. In a three-level optical system composed of two-closely spaced ground states and an excited state, or two-closely spaced excited states and a ground state, or arbitrarily spaced states, the refractive index change can result in not only absorption cancellation at line center but also two-photon coherence excitation between two closely spaced levels. This phenomenon is called dark is resonance or electromagnetically induced transparency (EIT) in the context of optically dense medium. Because EIT modifies the absorption spectrum of the medium, the medium's dispersion must be also modified via Kramers Kronig relations. Thus, the group velocity of a traveling light pulse can be controlled to be slowed down. This is so called a slow light phenomenon. Recently the slow light phenomenon has been observed in cold atoms, defected solids, optical fibers, and semiconductors.

In the case of dark resonance or EIT, the time needed for the refractive index change is, however, not limited by the carriers' lifetime or population relaxation time, but limited by the phase decay time. Generally, the phase decay time is faster than the carrier's lifetime at least twice in most atomic gases and hundreds times in most ion-doped crystals such as Pr3+-doped Y2SiO5. The two-photon coherence excitation on the closely spaced ground states can also be optically detected via nondegenerate four-wave mixing processes. The optical intensity of the nondegenerate four-wave mixing signals can be stronger than that of the original input laser. This signal amplification in the nondegenerate four-wave mixing processes based on EIT has already been demonstrated experimentally.

Even optical component is eligible for 100 GHz switching, electronic counterparts are not. Thus, speed constraints in an optoelectronic device lies on electronic part. If one can slow down optical switching speed without affecting overall switching bandwidth across the switching/routing device, then slow electronics can come up with the fast optical counterpart. This is the main motivation of the present invention and will be explained in detail below.

SUMMARY OF THE INVENTION is The primary object of the present invention is to provide a method of a delayed optical switching/routing based on a slow light and nondegenerate four-wave mixing processes. The main characteristic of the delayed optical router is that the switching/routing mechanism is based on the quantum coherence, where the quantum coherence is strongly bonded to the input photon component, whose group velocity can be slowed down and the slowdown factor can be controllable by using another optical field. Here, it should be noted that the slowdown factor does not degrade the overall data traffic rate at all, because the data traffic rate across the delayed optical switch/router is same. It means that the switching/routing bandwidth is invariant to the slowdown factor, Moreover, the slow group velocity is a direct result of medium's dispersion modification due to EIT or coherent population oscillations. In this case, one can utilize the delayed time on purpose for some optical signal processing. This function of the slowdown is actually main function of an optical buffer memory. Hence, the present invention of the delayed optical router includes the function of the optical buffer memory keeping the same data traffic rate with invariant switching/routing bandwidth.

Another object of the present invention is to provide an apparatus of the delayed optical router based on all-optical processing and all-optical delay-time controllability.

The delayed optical router relaxes the switching performance because slow electronics whose speed is less than 4 GHz can control even faster optical-data traffic (~40 Gbps) without degrading the overall traffic rate. For better understanding of this, let's carefully study the interface between air or a fiber and the nonlinear optical medium used for the present delayed optical router. At the front interface of it, the data traffic incident to the delayed optical router becomes slow down due to the slow group velocity. In more detail, the front part of the optical pulse envelope incident to the delayed optical router starts to compress in both space and time until the back part of the pulse envelope enters the medium. And then the compressed optical pulse propagates through the medium in a slow speed until it reaches at the back end of the medium. Here it should be noted that consecutive optical pulses entering the nonlinear medium (delayed optical router) do not collide each other at the interface even the propagation speed is very different. When the optical pulse leaves the medium at the back end, the front part of the optical pulse envelope starts to fly forward in a very high speed until the back part of the pulse envelope leaves the medium. Therefore the data traffic rate across the delayed optical router is invariant, and it is good advantage to the electronic counterparts to switch/route faster optical pulses.

Briefly described, the system of the delayed optical switch is composed of a nonlinear optical medium interacting with three coherent laser pulses, where one for the input signal (P) and the other two are for the coupling (C1) and control (C2). The three laser pulses are coupled to the nonlinear optical medium in free space or through optical fibers. The laser source for the coupling C1 and control C2 is either cw (continuous wave) or pulsed, and it is modulated for an optical pulse train to be synchronized to the input signal P. The nonlinear optical medium of the present delayed optical router is composed of at least three-energy levels. Two of them should be closely spaced ground (excited) state, and the third one should be an excited (ground) state.

The frequencies of the three laser beams are resonant or near resonant to the nonlinear optical medium to form a lambda type or V-type configuration. Two laser pulses, C1 and C2, have the same (different) frequency but timely consecutive (simultaneous). The laser pulse C1 acts as a coupling field to the nonlinear optical medium to modify the refractive index of it, so that the input signal pulse P can experience absorption cancellation with a very stiff dispersion profile resulting in the group velocity slowdown. Under this group velocity slowdown, the input pulse propagates slowly through the nonlinear optical medium but without absorption. The laser pulse C2 following the C1 acts as a control pulse to switch and route the slow light S of the input signal P by converting the quantum coherence excited on the closely spaced energy levels, due to coherent interactions of P and C1, into an optical generation of the output (D) via nondegenerate four-wave mixing processes. If there is no control pulse C2, the input signal becomes the slow light S. The output direction of the S and D can be adjusted to be spatially separated each other, by controlling the three laser beam propagation directions one another. This is a function of the optical router. By selecting difference frequency of the control pulse C2 from the coupling pulse C1, the delayed optical router can also act as a wavelength converter.

To achieve these and other advantages as described above and in accordance with the purpose of the present invention, this specification provides a method of delayed optical switch using a nonlinear optical medium composing two closely spaced ground states such that a transition between the two ground states is dipole forbidden, and an excited state such that two-photon transitions between the two ground states via the excited state are allowed, the method comprising following steps: a) producing a slow light, by using a first laser beam with a first frequency corresponding to a first transition between a first ground state of the two ground states and the excited state and a second laser beam with a second frequency corresponding to a second transition between a second ground state of the two is ground states and the excited state; b) producing a nondegenerate four-wave mixing signal, by using the first laser beam with the first frequency, the second laser beam with the second frequency and a third laser beam C2 with a third frequency corresponding to the second transition between the second ground state of the two ground states and the excited state; wherein the slow light is disappeared in response to the producing of the nondegenerate four-wave mixing generation or a phase conjugate; and c) connecting the nondegenerate four-wave mixing signal or the slow light to free space or to optical fibers.

This specification also provides a method of delayed optical switch using a nonlinear optical medium composing two closely spaced ground states such that a transition between the two said ground states is dipole forbidden, and an excited state such that two-photon transitions between said two ground states via said excited state are allowed, said method comprising following steps: a) applying to said nonlinear optical medium a first laser beam (P) as an input signal beam through an optical fiber, optical waveguide, surface plasmon, or free space at a first frequency corresponding to a first transition between a first ground state of said ground states and said excited state; b) applying a second laser beam (C1) through an optical fiber, optical waveguide, surface plasmon, or free space at a second frequency corresponding to a second transition between a second ground state of said ground states and said excited state; c) applying a third laser beam (C2) through an optical fiber, optical waveguide, surface plasmon, or free space at a third frequency corresponding to the second transition between the second ground state of said ground states and said excited state; d) adjusting an intensity of said second laser beam (C1), to produce a slow light (S) from said first laser beam (P), where a pulse delay of the slow light (S) from the first laser beam (P) is controllable by the intensity of the second laser beam (C1); e) adjusting an intensity of said third laser beam (C2) to produce a nondegenerate four-wave mixing signal or a phase conjugate (D) via phase matching condition among said slow light (S) from said first laser beam (P), said second laser beam (C1), and said third laser beam (C2) in propagation vectors and wavelengths; and f) connecting said nondegenerate four-wave mixing signal (D) or said slow light (S) to free space or to optical fibers, in which said nondegenerate four-wave mixing signal (D) and said slow light (S) are physically separated in propagation directions.

This specification also provides an apparatus for delayed optical router, said apparatus comprising: a nonlinear optical medium composing two closely spaced ground states such that a transition between said two ground states is dipole forbidden, and an excited state such that two-photon transitions between said two ground states via said excited state are allowed; a first means for applying a first laser beam, a second laser beam and a third laser beam to said nonlinear optical medium, wherein the first laser beam has a first frequency corresponding to a first transition between a first ground state of said two ground state and said excited state, the second laser beam has a second frequency corresponding to a second transition between a second ground state of said two ground state and said excited state, and the third laser beam has a third frequency corresponding to the second transition; and a second means for adjusting intensities and frequencies of said second laser beam and said third laser beam, so that said first laser beam can produce a slow light and said third laser beam can produce a nondegenerate four-wave mixing signal.

This specification also provides an apparatus for delayed optical router, said apparatus comprising: a nonlinear optical medium composing two closely spaced ground states such that a transition between said two ground states is dipole forbidden, and an excited state such that two-photon transitions between said two ground states via said excited state are allowed; a first laser beam source for generating a first laser beam (P) and applying, to said nonlinear optical medium, said first laser beam (P) at a first frequency corresponding to a first transition between a first ground state of said two ground state and said excited state; a second laser beam source for generating a second laser beam (C1) and for applying, to said nonlinear optical medium, said second laser beam (C1) at a second frequency corresponding to a second transition between a second ground state of said two ground state and said excited state; a first means for applying, to said nonlinear optical medium, a third laser beam (C2) at a third frequency corresponding to said second transition between said second ground state and said excited state; a second means for adjusting intensities and frequencies of said second laser beam (C1) and said third laser beam (C2), so that said first laser beam (P)

can produce a slow light (S) and said third laser beam (C2) can produce a nondegenerate four-wave mixing signal (D); a third means for adjusting the beam propagation directions of said the first laser beam (P), said second laser beam (C1), and said third laser beam (C2); and a fourth means for coupling or accessing said first laser beam (P), said second laser beam (C1), said third laser beam (C2) and said slow light (S) to said nonlinear optical medium.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying figures illustrate several embodiments of the present invention, and together with the description, serve to explain the principles of the invention. The drawings are only for the purpose of illustrating a preferred embodiment of the invention and are not to be construed as limiting the invention.

FIG. 1 illustrates a schematic diagram of the invention.

FIG. 2(a) shows an energy-level diagram of the nonlinear optical medium 108 of FIG. 1, where the frequency difference between two ground states is much smaller than that between the ground and the excited states.

FIG. 2(b) shows laser pulse propagation scheme through the nonlinear optical medium 108 of FIG. 1. The non-collinear propagation scheme is for the routing requirement.

FIG. 2(c) shows an interacting laser pulse sequence with the nonlinear optical medium 108 of FIG. 1. Under the action of the coupling C1, the input signal P becomes a slow light S.

FIG. 3 shows one-photon (absorption) and (c) two-photon coherence excited on the nonlinear optical medium 108 of FIG. 1: γ is a phase decay rate from excited state to ground state.

FIG. 4 shows experimental data of the input pulse temporal behavior inside the nonlinear optical medium 108 of FIG. 1. (a) Input signal P. (b) Slow light S under the action of coupling C1.

FIG. 5 shows numerical simulations of coherence conversion between two-photon coherence Re($\rho_{12}$) and one-photon coherence (absorption P or emission S). This coherence conversion is implemented by using nondegenerate four-wave mixing processes. The emission Im($\rho_{13}$) is a direct result of conversion process of the two-photon coherence Re($\rho_{12}$) toward the optical signal D in FIG. 1 and FIG. 2.

FIG. 6 shows experimental data of the delayed optical router. (a) The input signal P and the slow light S under the action of coupling C1. (b) Delayed optical routing from S to D under action of both coupling C1 and control C2.

FIG. 7 shows a schematic diagram of an apparatus of the delayed optical router in a forward propagation scheme.

FIG. 8 shows a schematic diagram of an apparatus of the delayed optical router in a backward propagation scheme.

DETAILED DESCRIPTION OF THE INVENTION

To get a better understanding, reference is now made to the drawings which illustrate the preferred embodiments of the invention.

Referring to FIG. 1, the delayed optical switch/router of the present invention is shown.

The delayed optical switch/router comprise at least two laser devices 101a, 101b, and a a nonlinear optical medium 108. The delayed optical switch/router receives three laser inputs 105, 106, and 107, and produces two light outputs 109 and 110. The laser inputs and outputs are connected to the nonlinear optical medium 108 through either fiber, waveguides, or free space.

A first laser device 101a of the two laser device produce a first laser beam (P) 107, and applies to the nonlinear optical medium 108.

A second laser device 101b produces a continuous wave or pulsed wave. The second laser device 101b is connected a splitter 102. The splitter 102 splits the continuous wave or pulsed wave into a second laser beam (C1) 105 and a third laser beam (C2) 106. The splitter 102 is connected to a first optical modulator 103 and a second optical modulator 104. The first optical modulator 103 modulates the second laser beam (C1) 105 to form a pulse train which is synchronized to the first laser beam (P). The second optical modulator 104 modulates the third laser beam (C2) 106 to form a pulse train, which is timely located on the position of the slow light S 109, whenever it is needed.

The energy level diagram of the nonlinear optical medium 108 of FIG. 1 is shown in FIG. 2(a). The nonlinear optical medium 108 of FIG. 1 has three energy states; |1>, |2>, and |3>. In particular, there are two closely spaced ground energy levels |1>, |2> and, an excited energy level |3>. The state |3> of FIG. 2(a) is higher than |1> and |2>, and |2> is higher than |1> in energy. Realistically, the nonlinear optical medium 108 of FIG. 1 should have more energy levels, but only the energy levels shown in FIG. 2(a) contribute to the delayed optical routing mechanism of the present invention. Here, the closely spaced two ground energy levels can be formed from the hyperfine splitting in rare-earth doped crystals or neutral atoms. The energy level structure of FIG. 2(a) can also be made artificially by multiply coupling semiconductor quantum wells or quantum dots.

A laser output D is generated by nondegenerate four-wave mixing processes involving three laser interactions of the S, C1, and C2 with the nonlinear optical medium. A laser output S is a slow light component of the input pulse P when the coupling C1 is applied.

FIG. 2(b) shows propagation directions of the interacting laser pulses. The propagation direction $k_D$ of the routed pulse D (for the slow light S) is determined by the phase matching conditions: $k_D = k_P - k_{C2} - k_{C1}$. Here, it should be noted that routing is made by nondegenerate four-wave mixing generation D, and the D is delayed because it is a coherence conversion of the slow light S. Therefore, whenever the control pulse C2 turns on, it routes the slow light S into D. This is how the optical routing is delayed. Moreover, the routed signal D can be strongly enhanced owing to dark resonance or EIT.

Enhancement of nondegenerate four-wave mixing processes was suggested by Harris in Physical Review Letters, Vol. 64, pp. 1107-1110 (1991) and were demonstrated experimentally in atomic gases by Jain et al. in Optics Letters Vol. 18, pp. 98-101 (1993) and in ion-doped solid by Ham et al. in Optics Letters, Vol. 22, pp. 1138-1140 (1997). Signal amplifications and high-conversion efficiency using atomic gases in nondegenerate four-wave mixing processes were experimentally demonstrated by Hemmer at al. in Optics Letters, Vol. 20, pp. 982-984 (1995) and Jain et al. in Physical Review Letters, Vol. 77, pp. 4326-4329 (1996), respectively. The high-conversion efficiency of the nondegenerate four-wave mixing processes was also experimentally demonstrated in ion-doped solids by Ham et al. in Physical Review A, Vol. 59, pp. R2583-2586 (1999). The enhancement of nondegenerate four-wave mixing processes is based on reduced first-order linear susceptibility (absorption cancellation due to EIT) and increased thirdorder nonlinear susceptibility owing to destructive and constructive quantum interference, respectively.

To show more detail relations between the laser inputs and nondegenerate four-wave mixing signals, first of all coherence excitations should be examined. To see the coherence excitation, density matrix ρ is introduced. Density matrix is a useful tool to see system's macroscopic ensemble: *Quantum optics*, Cambridge University Press, New York, N.Y. (1997) Ed. Scully and Zubairy.

In FIG. 3(a), two laser inputs P and C1 induce two-photon coherence $\rho_{12}$ on the transition |1>-|2>. Especially, the two-photon coherence is strongly increased when dark resonance or EIT involves:

The $\delta_1$ of FIG. 3(a) is a frequency detuning of the input pulse 107 of FIG. 1 from the resonance frequency from levels |1> to |3>. Here, dark resonance or EIT is the same physical phenomenon, but the term EIT roots in the absorption cancellation of a week resonant electromagnetic fields under the strong electromagnetic fields interaction with an optically thick medium resulting destructive quantum interference. As seen in FIGS. 3(b) and 3(c), the two-photon coherence Re($\rho_{12}$) is strongly dependent on the absorption change of Im($\rho_{13}$) at line center.

The two-photon coherence Re($\rho_{12}$) can also be optically detected via nondegenerate four-wave mixing processes as mentioned above. The relationship between the enhanced nondegenerate four-wave mixing signal 100 of FIG. 1 (or D of FIG. 2(a)), and the two-photon coherence Re($\rho_{12}$) is as follows: I(D)∝[Re$\rho_{12}$]$^2$. This relation was experimentally demonstrated by Ham et al. in Physical Review A, Vol. 59, R2583-R2586 (1999).

As seen in FIGS. 3(b) and 3(c) the two laser pulses of P and C1 modify optical coherence. Especially the nonabsorption component of the one-photon coherence Im($\rho_{13}$) and spin component of the two-photon coherence Re($\rho_{12}$) together forms a dark resonance polariton, where both components propagate together with one unit. It is easy to understand the ratio between photon component and spin component in the dark resonance polariton. In the electromagnetism theory, electric amplitude and energy flux cannot be changed across a boundary between two dielectric media, in this case air (or fiber) and nonlinear optical medium. However, the group velocity is strongly suppressed inside the medium due to slow light phenomenon. However, the energy flux between the boundary must not be changed. To satisfy energy conservation theory, therefore, incoming signal should convert its energy into another form by the ratio of group velocities. Under the condition of $10^7$ group velocity ratio, the photon component of the slow light to that of the input pulse should be negligibly small to be $10^{-7}$. The rest part is in the spin coherence Re($\rho_{12}$).

FIG. 4(a) shows experimental observation of the slow light S. The slow light phenomena were observed in a Bose-Einstein condensate and a rare-earth doped crystal using EIT: Hau et al., Nature Vol. 397, pp. 594-598 (1999). Even physics is different from EIT, coherent population oscillation has been used for the same slow light phenomena and observed in a defected crystal, semiconductor quantum wells, and optical fibers: Bigelow et al., Science Vol. 301, pp. 200-202 (2003). FIG. 4(b) shows an experimental data of the slow light S of FIG. 2 without an action of the laser input pulse C2. For the experiments, hyperfine states of $^3H_4$ of $Pr^{3+}$ match the three-ground states of FIG. 2(a), and one of the hyperfine states of $^1D_2$ of $Pr^{3+}$ matches the excited state of FIG. 2(a). The crystal structure of the $Pr^{3+}$ doped $Y_2SiO_5$ was demonstrated by Maksimov et al. in Sov. Phys.-Doklady Vol. 13, pp. 1188- (1969). FIG. 4(a) is the transmitted input pulse P as a reference, where the coupling pulse C1 does not timely overlapped with the input pulse P. FIG. 4(b) shows the slow light S delayed by time τ, where the coupling pulse C1 timely covers the input pulse P, so that the modified refractive index makes the group velocity of P changed.

FIG. 5 shows numerical simulations of the coherence conversion via nondegenerate four-wave mixing processes discussed above. The two-photon (Raman) coherence Re($\rho_{12}$) excited by the Raman fields P and C1 in FIG. 3(c) (see also FIGS. 1~3) is retrieved by the control pulse C2 resulting in one-photon emission of Im($\rho_{13}$): This emission is the output pulse D in FIG. 1 and FIG. 2 and was experimentally demonstrated by Ham et al., in Optics Letters Vol. 22, pp. 1138-1140 (1997) and Physical Review Letters, Vol. 88, p. 236021 (2002).

FIG. 6 show the delayed optical switching/routing of the present invention.

The input pulse sequence is the same as FIG. 2(c). As shown FIG. 6(a), the input pulse P is slowed down to form the slow light S as discussed above. When the control pulse C2 is fired right after the coupling pulse C1, where the slow light S should be timely overlapped, the output D is created while the output S disappears. The propagation direction of the output pulses S and D in FIG. 6 is as shown in FIG. 2(b). Here it should be noted that the switching/routing time either for fast light or slow light depends only on the Rabi frequency of the control pulse C2 for rising time and coherence phase decay time for falling time, where the falling time determines the overall switching time. This means that optical switching time of the present invention is invariant to the slowdown factor, but the group delay time τ is controllable and very useful for information processing purpose in an optical switching/routing node of fiber-optic communications.

FIG. 7 illustrates a specific apparatus of the present invention, a delayed optical router in a forward propagation scheme. The three laser inputs 701, 702, and 703 in FIG. 7 stand for the laser inputs 107, 105, and 106 in FIG. 1 respectively. The optical medium 705 stands for 108 in FIG. 1. The outputs 706 and 707 stand for 109 and 110 in FIG. 1, respectively. The input laser beams are focused and collimated through a lens 704. The output beam S 706 (or, D 707) exists only when the control beam C2 703 turns off (or, on). Here it should be noted that the slow factor of the input pulse P 701 is determined by adjusting the coupling pulse intensity of C1 702. To act as a delayed optical switch/router the control pulse C2 703 must synchronize to the slow light S 706.

FIG. 8 illustrates a specific apparatus of the present invention, a delayed optical switch in a backward propagation scheme: A phase conjugate scheme. The three laser inputs 801, 802, and 803 in FIG. 7 stand for the laser inputs 107, 105, and 106 in FIG. 1 respectively. The optical medium 805 stands for 108 in FIG. 1. The is outputs 806 and 807 stand for 109 and 110 in FIG. 1, respectively. The input laser beams are focused and collimated through a lens 804. To separate the switched beam D 807 from the input signal beam P 801, a beam splitter 808 is inserted. The output beam S 806 (or, D 807) exists only when the backward control beam C2 803 turns off (or, on).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of delayed optical switch using a nonlinear optical medium composing two closely spaced ground states such that a transition between the two said ground states is dipole forbidden, and an excited state such that two-photon transitions between said two ground states via said excited state are allowed, said method comprising following steps:
   a) applying to said nonlinear optical medium a first laser beam (P) as an input signal beam through an optical fiber, optical waveguide, surface plasmon, or free space at a first frequency corresponding to a first transition between a first ground state of said ground states and said excited state;
   b) applying a second laser beam (C1) through an optical fiber, optical waveguide, surface plasmon, or free space at a second frequency corresponding to a second transition between a second ground state of said ground states and said excited state;
   c) applying a third laser beam (C2) through an optical fiber, optical waveguide, surface plasmon, or free space at a third frequency corresponding to the second transition between the second ground state of said ground states and said excited state;
   d) adjusting an intensity of said second laser beam (C1), to produce a slow light (S) from said first laser beam (P), where a pulse delay of the slow light (S) from the first laser beam (P) is controllable by the intensity of the second laser beam (C1);
   e) adjusting an intensity of said third laser beam (C2) to produce a nondegenerate four-wave mixing signal or a phase conjugate (D) via phase matching condition among said slow light (S) from said first laser beam (P), said second laser beam (C1), and said third laser beam (C2) in propagation vectors and wavelengths; and
   f) connecting said nondegenerate four-wave mixing signal (D) or said slow light (S) to free space or to optical fibers, in which said nondegenerate four-wave mixing signal (D) and said slow light (S) are physically separated in propagation directions.

2. The method of claim 1, wherein said excited state is selected such that its energy level is higher than the energy level of said ground states.

3. The method of claim 1, wherein the first ground state of said ground states is selected such that its energy level is higher than the energy level of the second ground state of said ground state.

4. The method of claim 1, wherein said first laser beam (P) and said second laser beam (C1) are synchronized to temporally overlap both said first laser beam (P) and said second laser beam (C1), and to extend said second laser beam (C1) in time over the back-end of said first laser beam (P).

5. The method of claim 1, wherein said slow light (S) is temporally delayed against said first laser beam (P) with a delay time.

6. The method of claim 5, wherein said third laser beam (C2) acts as a control beam to switch and route said slow light (S) via nondegenerate four-wave mixing processes generating signal (D).

7. The method of claim 6, wherein the third frequency of said third laser beam (C2) is different from the second frequency of said second laser (C1) to produce said nondegenerate four-wave mixing signal (D) at different frequency from the first frequency of said first laser beam (P).

8. A method of delayed optical switch using a nonlinear optical medium composing two closely spaced ground states such that a transition between the two ground states is dipole forbidden, and an excited state such that two-photon m transitions between the two ground states via the excited state are allowed, the method comprising following steps:
   a) producing a slow light, by using a first laser beam with a first frequency corresponding to a first transition between a first ground state of the two ground states and the excited state and a second laser beam with a second frequency corresponding to a second transition between a second ground state of the two ground states and the excited state;
   b) producing a nondegenerate four-wave mixing signal, by using the first laser beam with the first frequency, the second laser beam with the second frequency and a third laser beam C2 with a third frequency corresponding to the second transition between the second ground state of the two ground states and the excited state; wherein the slow light is disappeared in response to the producing of the nondegenerate four-wave mixing generation or a phase conjugate; and
   c) connecting the nondegenerate four-wave mixing signal or the slow light to free space or to optical fibers.

9. The method of claim 8, wherein the first laser beam and the second laser beam are synchronized to temporally overlap both the first laser beam and the second laser beam and to extent the second laser beam in time over a back-end of the first laser beam.

10. The method of claim 8, wherein the slow light is temporally delayed against the first laser beam with a delay time.

11. The method of claim 8, wherein the third laser beam acts as a control beam to switch and route the slow light to the nondegenerate four-wave mixing processes generating signal.

12. The method of claim 8, wherein the third frequency of the third laser beam is different from the second frequency of the second laser to produce the nondegenerate four-wave mixing signal at different frequency from the first frequency of the first laser beam.

13. An apparatus for delayed optical router, said apparatus comprising:
   a nonlinear optical medium composing two closely spaced ground states such that a transition between said two ground states is dipole forbidden, and an excited state such that two-photon transitions between said two ground states via said excited state are allowed;
   a first laser beam source for generating a first laser beam (P) at a first frequency corresponding to a first transition between a first ground state of said two ground state and said excited state and for applying, to said nonlinear optical medium, said first laser beam (P);
   a second laser beam source for generating a second laser beam (C1) at a second frequency corresponding to a second transition between a second ground state of said two ground state and said excited state, and for applying, to said nonlinear optical medium, said second laser beam (C1);
   a first means for applying, to said nonlinear optical medium, a third laser beam (C2) at a third frequency corresponding to said second transition between said second ground state and said excited state;
   a second means for adjusting at least one of an intensity and a frequency of at least one of said second laser beam (C1) and said third laser beam (C2), so that a slow light (S) is produced using said first laser beam (P) and a nondegenerate four-wave mixing signal (D) is produced using said third laser beam (C2); and a third means for connecting said slow light (S) or said signal (D) to said nonlinear optical medium.

14. The apparatus of claim 13, wherein said first means corresponds to a means for splitting said second laser beam into both said second laser beam and said third laser beam.

15. The apparatus of claim 13, wherein said first means may further generate said third laser beam.

16. The apparatus of claim 13, wherein said nonlinear optical medium is a solid.

17. The apparatus of claim 13, wherein said nonlinear optical medium is multiply coupled semiconductors.

18. The apparatus of claim 17, in which said two ground states, and said excited state are selected in conduction band of said multiply coupled semiconductors.

19. The apparatus of claim 13, wherein said third means is an optical fiber, an optical waveguide, surface plasmon waveguide, or a free space.

20. An apparatus for delayed optical router, said apparatus comprising:
a nonlinear optical medium composing two closely spaced ground states such that a transition between said two ground states is dipole forbidden, and an excited state such that two-photon transitions between said two ground states via said excited state are allowed;
a first means for applying a first laser beam, a second laser beam and a third laser beam to said nonlinear optical medium, wherein the first laser beam has a first frequency corresponding to a first transition between a first ground state of said two ground state and said excited state, the second laser beam has a second frequency corresponding to a second transition between a second ground state of said two ground state and said excited state, and the third laser beam has a third frequency corresponding to the second transition; and
a second means for adjusting at least one of an intensity and a frequency of at least one of said second laser beam and said third laser beam, so that a slow light is produced using said first laser beam and a nondegenerate four-wave mixing signal is produced using said third laser beam.

* * * * *